ated Feb. 7, 1967

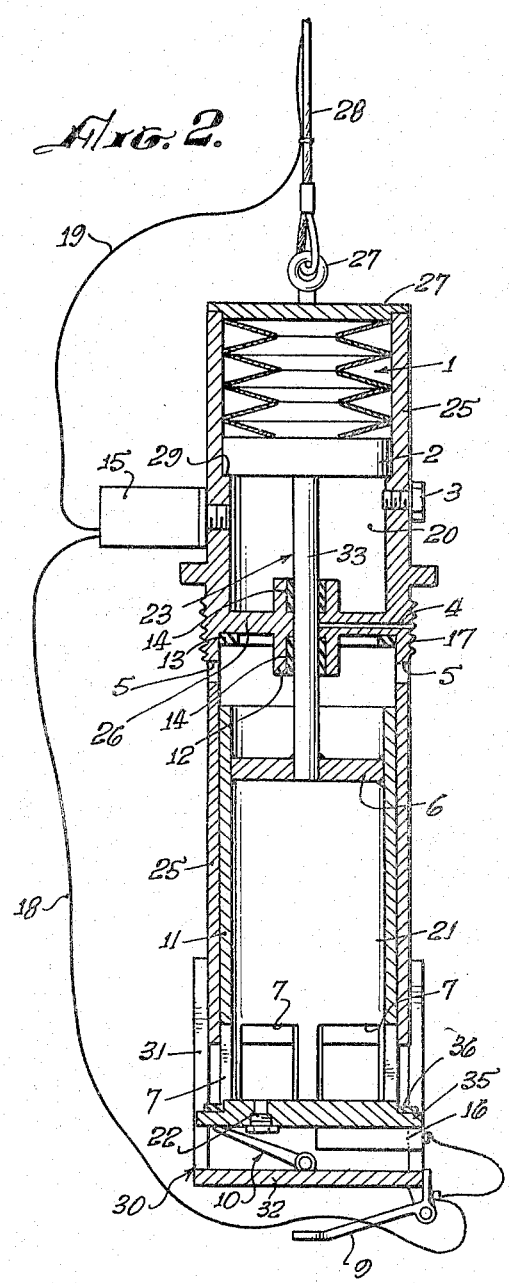

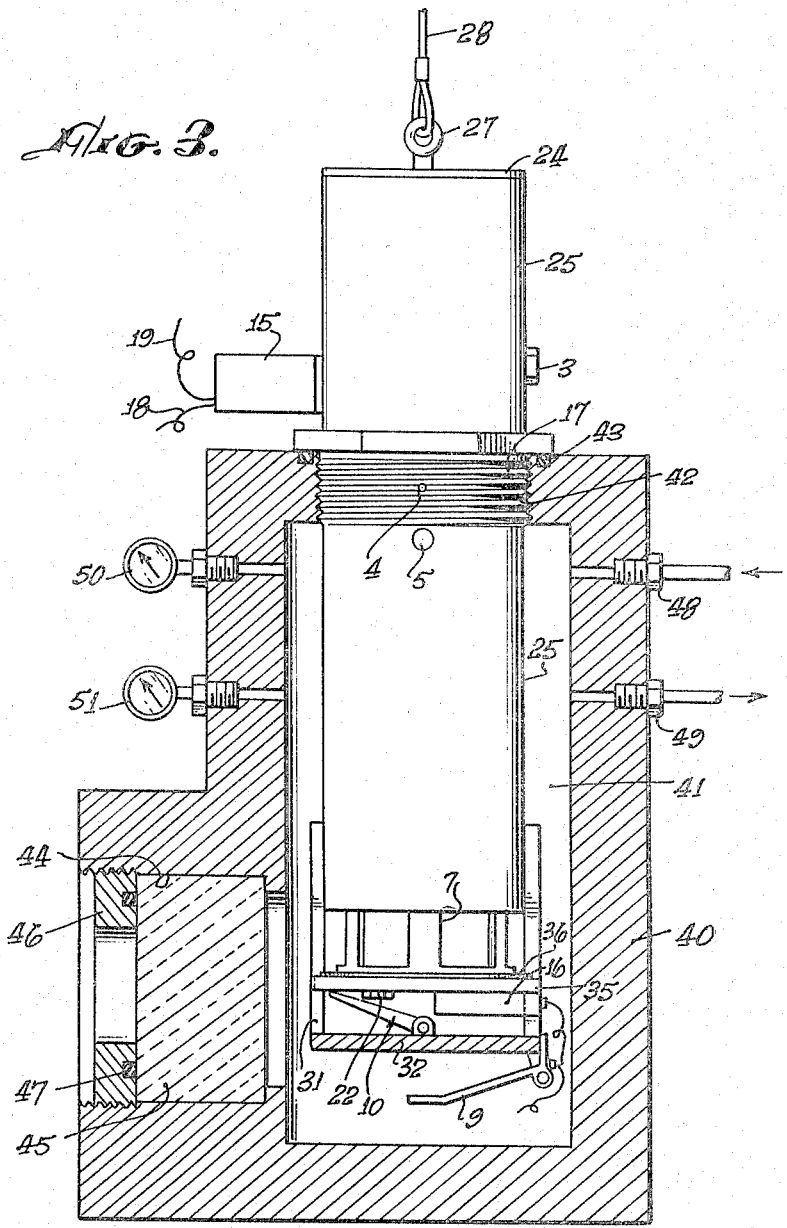

3,302,464
STERILE HIGH PRESSURE OCEAN SAMPLER
Arthur F. Langguth, 2125 Thrush Ave.,
Oxnard, Calif. 93030
Filed June 30, 1964, Ser. No. 379,418
10 Claims. (Cl. 73—425.4)

The invention described herein may be manufactured and used by or for the Government of the United States of America for governmental purposes without the payment of any royalties thereon or therefor.

This invention relates to deep sea samplers for the obtaining of specimens of marine biota and ocean bottom sediment at great depths.

In modern oceanography, great interest is being shown in the character of the ocean bottom at great depths as well as the character of the marine biota existing on and in the sediment of the ocean bottom at such depths. In order to obtain samples of such material, particularly with relation to the marine biota, some means must be provided to establish and maintain ambient pressures peculiar to the location from which such samples are taken. The maintenance of such pressures is of course necessary so that the specimen or sample may be observed under surface laboratory facilities.

The object of this invention, therefore, is to provide a sterile high pressure ocean sampler that is adapted to automatically obtain a sample of the ocean bottom at great depths including such marine biota as may be present.

Another object of this invention is to provide a deep ocean sampler adapted to further penetrate the ocean bottom when it reaches the top surface thereof.

A further object of this invention is to provide a sterile sampling chamber which may be adapted to receive a sample of the ocean bottom at the pressure there existent and then to be sealed so as to maintain the ambient pressure at which the sample was procured while and until the sampler is returned to the surface of the ocean over the location at which the sample was obtained.

Other objects and advantages and novel features of the invention will become apparent from the following detailed description of the invention when considered in conjunction with the accompanying drawings wherein:

FIG. 2 is a cross-sectional elevation of the invention in an open condition; and FIG. 3 is a cross-sectional elevation of a pressurized viewer.

Figure 1:
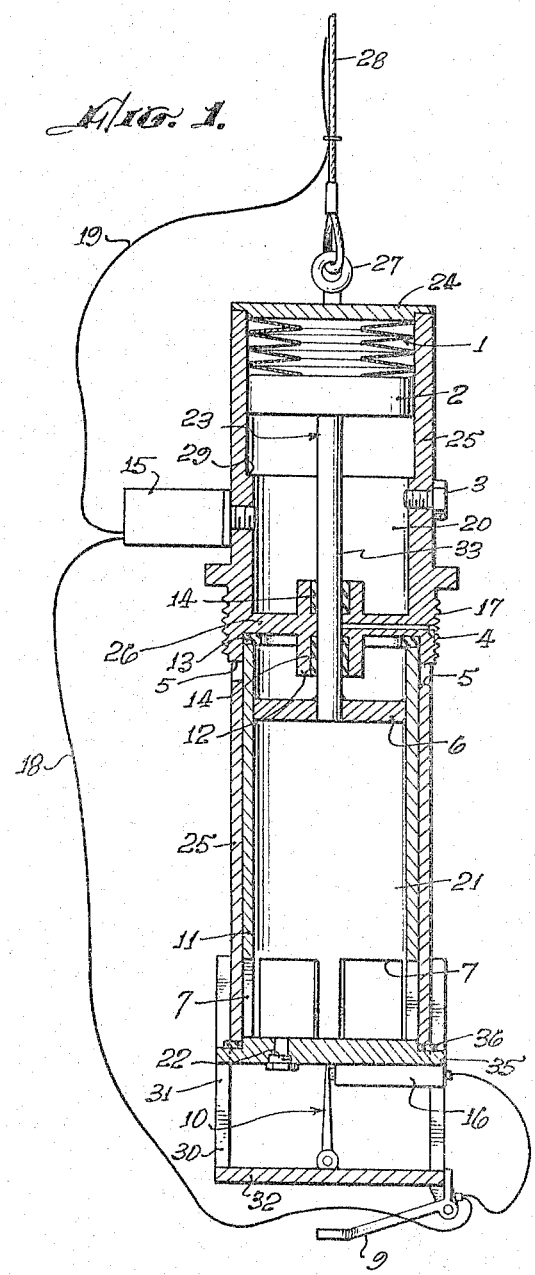
FIGURE 1 is a cross-sectional elevation of the invention in the closed condition.

With reference to FIGS. 1 and 2, the sterile high pressure ocean sampler comprises an outer cylindrical casing 25, an inner cylindrical telescoping casing 11, a spider 30, and a movable piston member 23.

The outer cylindrical casing 25 has two compartments separated by a bulkhead 26. The upper compartment or closing chamber 20 has a cover 24 which may be suitably secured to the casing 25 after the insertion of the other parts. Cover 24 is furnished externally with a ringbolt or bail 27 to which handling cable 28 may be secured for lowering and raising the sampler to and from the ocean bottom. By slightly enlarging the upper bore of casing 25, shoulder 29 is formed to act as a lower stop for piston 2. Below shoulder 29 is pressure relieving threaded plug 3 in casing 25 and communicating with closing chamber 20. Outboard of the bulkhead 26, a threaded flange 17 is formed externally on casing 25 for a purpose to be hereinafter explained. Somewhat below the bulkhead 26, casing 25 is pierced with horizontal row of vents 5.

The inner cylindrical sampler casing 11 is fitted telescopically into the lower compartment of casing 25 with its upper open end disposed adjacent to the bulkhead 26 and with its lower outwardly flanged end 35 disposed adjacent to the lower end of casing 25. Seals 13 and 36 are provided respectively at these points so as to hermetically seal and protect the sampler chamber 21 in the interior of inner sampler casing from being contaminated, particularly while the sampler is being lowered. Large rectangular ports 7 are provided in the lower end of this inner casing 11 for the reception of the ocean bottom sample as will be described in more detail later.

Spider 30 which may consist of three or more arms 31 extending upwardly from a base structure 32 serves as a stop for limiting the downward movement of the inner sampler casing as well as a support for the latch or trigger 10. Spider arms 31 may be welded or otherwise suitably secured to the lower outer portion of the casing 25. Sampler casing flange 35 may be grooved correspondingly so that the inner sampler casing 11 will not rotate as it is forced downwardly and then upwardly in the outer casing 25. Spider base structure 32 also serves as a support for the centrally located pivoted latch or trigger 10.

Movable piston member 23 consists of a rod 33 surmounted above the bulkhead 26 by an upper moving piston 2 and having a lower piston 6 secured thereto below bulkhead 26. Rod 33 passes through an elongated packing bushing 12 formed in bulkhead 26. This packing bushing is adapted to receive seals 14 which are needed to prevent gas or water leakage along the rod 33 between chamber 20 and 21. A small radial vent 4 is formed in the threaded flange 17 leading from the bushing bore through which rod 33 reciprocates to the exterior of the sampler for additional protection against leakage of pressurized gas from chamber 20 into sampling chamber 21. Lower piston 6 is secured to the interior of inner casing 11 by welding or other suitable means. Thus, piston member 23 moves with inner casing 11 as the latter moves with relation to outer casing 25 under the influence of forces to be described.

Above movable piston 2 in upper closing chamber 20 is located a series of Belleville spring washers 1 or other resilient means. This spring arrangement is mounted between the top of piston 2 and the lower surface of cover 24. It is under compression at all times and acts so as to force piston 2, piston member 23, and inner casing 11 in a downwardly direction. When armed for descent, inner casing 11 is held upwardly against the full force of the spring arrangement by means of pivoted latch 10 which bears against the lower surface of inner casing flanged end 35.

An explosive-operated plunger 16 is mounted on the lower surface of flanged end 35 in juxtaposition to the latch 10. This plunger may be actuated either by the rotatable pivoted finger switch 9 when the latter makes contact with the ocean bottom or by a switch in the surface tender vessel acting through electrical cables 19 and 18 which are incorporated in or are secured to handling cable 28.

A slow burning explosive charge 15 is mounted on the vertical wall of outer casing 25 somewhat below the internal shoulder 29. This charge 15 is also connected with a manual switch in the surface tender through electrical cable 19 as well as a source of electrical power. Explosive charge 15 may also be furnished with a long delay fuse.

In operation, the sampler is armed by pushing the inner casing 11 upwardly against spring arrangement 1 until the latch 10 may be fixed in a vertical position against the flanged end plate 35. Sampling chamber 21 may then be sterilized through plug fitting 22 which is installed in the flanged end plate 35. If desired, the air may be exhausted from this chamber 21 through this plug fitting 22. Arming also includes the insertion of fresh explosive charges into receptacles 15 and 16. As the sampler is lowered by its cable 28, the finger switch 9 ultimately contacts the ocean bottom and actuates the electrical circuit controlling the explosive charge in the plunger 16. This plunger 16 then forces the latch 10 sideways allowing the inner sampler casing 11 to descend under the influence of the spring arrangement 1 until the lower surface of piston 2 abuts against the shoulder 29. In this open condition, as illustrated in FIG. 2, the large apertures or ports 7 formed in inner casing 11 are now below the lower end of outer casing 25 and the sample of the ocean bottom oozes into the sampling chamber 21. It will be noted that the spring action of spring arrangement 1 causes the inner sampler casing 11 to penetrate further into the sediment of the ocean bottom.

In view of the considerable pressure differential existing between the water adjacent to the ocean bottom and the interior of the sampling chamber 21, particularly when the air has previously been exhausted therefrom, this chamber is soon filled with the sediment or ocean bottom sample. After an appreciable time delay, slow-burning explosive charge 15 is actuated which then discharges its pressurized gas into the closing chamber 20. This pressurized gas forces piston 2 upwardly against the spring arrangement 1 which, by means of rod 33 and lower piston 6, draws inner casing 11 up into the outer casing 25 and the seals 13 and 36 become operative to seal sampling chamber 21 against any further contamination during its ascent to the surface and to maintain the pressure therein.

While the sampler is in the open condition, as shown in FIG. 2, it is possible for water under pressure to seep upwardly between the walls of the inner and outer casings. Ports 5 are therefore provided in the portion of the outer casing just under the bulkhead 26 so as to allow full access to the water under pressure as soon as casing 11 starts to move out of the outer casing 25. This pressurized water, being introduced on top of piston 6, assists in the downward movement of the inner casing and also serves to prevent the upward seepage between the two cylinders. These ports 5 also serve the function of releasing the water above piston 6 as the piston member 23 is forced upwardly by the pressurized gas from charge 15.

Under these latter conditions, the sampler now assumes the configuration shown in FIG. 1 with the exception that latch 10, having previously been pushed sideways by explosive-operated plunger 16 remains in the horizontal position on the upper surface of the spider base structure 32.

It should be noted that, when the sampler is allowed to contact the ocean bottom, the action of the explosive charges is controlled automatically. Thus, when finger switch 9 contacts the ocean bottom, it closes the electrical power circuit passing through cables 18 and 19 thereby igniting the explosive charge in plunger 16 and also igniting the time delay fuse in explosive charge receptacle 15. After a predetermined time interval as established by the time delay fuse, the main slow-burning charge in receptacle 15 is activated, producing the pressurized gas as previously described.

When, however, it is desired to obtain samples of water carrying specimens of marine biota at a less depth than that over the actual ocean bottom, the explosive charges in receptacles 16 and 15 can be exploded by manual switches carried in the surface tender connected through additional leads in the electrical cables 18 and 19 to their respective explosive charges.

In order to accomplish surface observation of the sample obtained under the ambient conditions indigenous to the locality from which it was obtained, viewing chamber 40 is provided. This viewing chamber, which is designed to withstand greater pressures is provided with a chamber 41 having an upper threaded bore 42. This bore is adapted to receive the external threaded flange 17 carried by outer casing 25 of the sampler described above. A seal 43 is furnished for maintaining the pressure later developed in chamber 41.

The viewing chamber 40 is further provided with a view port 44 containing a pressure-resistant window 45, a threaded sealing annulus 46 and a seal 47. Pressure connections 48 and 49 are installed in one side of the wall of chamber 41 for the introduction of sea water under desired pressure and temperature conditions. Temperature and pressure gauges 50 and 51 are also furnished in another portion of the wall of chamber 41 for obvious purposes.

In the use of the viewing chamber, the sampler is inserted in threaded bore 42 and screwed against the seal 43. Pressurized sea water is then introduced into chamber 41 at a pressure and temperature similar to those ambient to the sample when taken. Threaded plug 3 in the upper wall of outer casing 25 is then slowly removed, releasing the pressurized gas from closing chamber 20. As this gas is released, spring arrangement 1 expands against piston 2 forcing inner casing 11 downwardly out of outer casing 25 until the position of ports attain the condition as shown in FIG. 2. The sample can then be viewed through the window 45 and the ports 7 or, more probably, the sample will ooze into the bottom of chamber 41 where it can be observed through window 45.

Obviously, many modifications and variations of the present invention are possible in the light of the above teachings. It is therefore to be understood that within the scope of the appended claims the invention may be practiced otherwise than as specifically described.

I claim:

1. A sterile high pressure ocean sampler comprising:
    an outer hollow cylindrical casing having a closed upper end and an open lower end;
    a diametrical transverse bulkhead disposed in said outer casing, said bulkhead dividing the interior of said outer hollow casing into an upper closing chamber and a lower chamber;
    an inner hollow cylindrical casing having an open upper end and a closed flanged lower end, said inner casing being adapted to fit telescopically within said lower chamber of said outer casing;
    an inner sampling chamber formed between the interior walls and the closed flanged lower end of said inner casing;
    means for reciprocating said inner casing with respect to said outer casing;
    port means formed in the lower end of said inner casing for the reception of ocean samples into said sampling chamber; and
    sealing means between said outer and inner casings for sealing said inner sampling chamber when said inner casing is fully telescopically inserted within said lower chamber of said outer casing.

2. A sterile high pressure ocean sampler as claimed in claim 1 further characterized by said means for reciprocating said inner casing with respect to said outer casing comprising:
    an upper movable piston contained with said upper closing chamber of said outer casing;
    a lower piston member contained in and secured to the interior walls of said inner casing;
    a centrally disposed sealed apertures in said transverse bulkhead; and
    a rod member extending between said upper movable piston and said lower piston member and secured thereto, said rod member passing through said sealed aperture in said bulkhead.

3. A sterile high pressure ocean sampler as claimed in claim 2 wherein said means to reciprocate said inner casing with respect to said outer casing further includes:
    resilient means inserted between the upper surface of said movable piston and the inner surface of said upper closed end of said outer casing, said resilient means adapted to force said movable piston and said inner casing in a downward direction with respect to said outer casing; and means for limiting the downward movement of said movable piston.

4. A sterile high pressure ocean sampler as claimed in claim 3 further characterized by having an open spider structure secured to the open lower end of said outer casing, and latch means pivotally supported by said spider structure and engaging the flanged lower end of said inner casing for maintaining said inner casing in full sealed telescopic insertion with respect to the lower chamber of said outer casing against the downward force of said resilient means.

5. A sterile high pressure ocean sampler as claimed in claim 4 further characterized by having an explosive operated plunger means installed on said flanged lower end of said inner casing in juxtaposition to said latch means for disengaging said latch means from said flanged lower end of said inner casing.

6. A sterile high pressure ocean sampler as claimed in claim 5 further characterized by said open spider structure supporting a pivoted normally open finger switch adapted to be electrically closed when said finger switch contacts the ocean bottom and an electrical circuit linking said finger switch and said explosive-operated plunger means.

7. A sterile high pressure ocean sampler as claimed in claim 2 further characterized by said means for reciprocating said inner casing with respect to said outer casing comprising;

compressive spring means inserted between said upper movable piston and the closed upper end of said outer casing for moving said inner casing downwardly with respect to said outer casing;

explosive means associated with said upper closing chamber of said outer casing for filling said chamber with pressurized gas underneath said movable piston whereby said inner casing is moved upwardly with respect to said outer casing; and stop means for limiting the movement of said movable piston in either direction.

8. A sterile high pressure ocean sampler as claimed in claim 1 further characterized by having:

a pressurized gas producing explosive charge associated with said upper closing chamber of said outer casing;

an explosive-operated plunger means associated with said inner casing;

a rotatable normally open finger switch associated with said sampler, said finger switch adapted to be electrically closed when said sampler and switch contact the ocean bottom;

a source of electrical power disposed in a tender vessel at the surface of said ocean;

electrical cables extending from said source of electrical power to said explosive charge, said explosive-operated plunger means, and said finger switch; and means for successively firing said explosive-operated plunger means and said gas producing explosive charge when said finger switch contacts the ocean bottom.

9. A sterile high pressure ocean sampler as claimed in claim 8 further characterized by having manually operated switch means disposed adjacent to said source of electrical power in said surface tender vessel for separately firing said explosive operated plunger means and said gas producing explosive charge.

10. A sterile high pressure ocean sampler comprising:

an outer hollow cylindrical casing having a closed upper end and an open lower end;

a hollow cylindrical inner casing having a open upper end and a closed lower end, said inner casing being disposed telescopically within said outer casing and forming an inner sampling chamber;

port means formed in the lower end of the inner casing for receiving ocean samples into the sampling chamber; and means to reciprocate the inner casing with respect to the outer casing, said port means being open in one position of said inner casing and closed in another position of said inner casing wherein the reciprocating means positions the inner casing so that the port means is closed during descent of the sampler and positions the inner casing so that the port means is opened when a sample is to be taken.

References Cited by the Examiner
UNITED STATES PATENTS

| 1,644,415 | 10/1927 | Cosgro | 73—425.4 |
| 2,155,442 | 4/1939 | Parkhurst | 73—425.4 |
| 2,638,321 | 5/1953 | Isbell | 175—6 |
| 2,798,378 | 7/1957 | Del Raso et al. | 73—421 X |
| 3,094,928 | 6/1963 | Costley et al. | |

LOUIS R. PRINCE, *Primary Examiner.*

D. M. YASICH, *Assistant Examiner.*